DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 11

T883,014

SILVER HALIDE EMULSIONS CONTAINING IMIDAZOLIUM SPECTRAL SENSITIZING DYES

Donald W. Heseltine, 22 Edgewater Lane, and Leslie G. S. Brooker, 915 Winona Blvd., both of Rochester, N.Y. 14617

Filed June 1, 1970, Ser. No. 42,534
Int. Cl. G03c *1/08, 1/10*
U.S. Cl. 96—131
No Drawing. 27 Pages Specification

Novel dyes of the carbocyanine, dicarbocyanine, merocyanine and merocarbocyanine classes derived from imidazolium salts are used to advantage as spectral sensitizing dyes for photographic silver halide emulsions. Our symmetrical carbocyanines and dicarbocyanines are advantageously prepared by condensing one of our imidazolium salts with an appropriate intermediate, such as, diethoxymethyl acetate, ethyl orthoformate, ethyl orthoacetate, ethyl orthopropionate, trimethoxypropene, β-anilinoacrolein anil hydrochloride; our unsymmetrical carbocyanines and dicarbocyanine dyes are advantageously prepared by condensing our imidazolium salts with intermediates having any of the 5- to 6-membered basic heterocyclic nuclei, e.g., a thiazole, a benzothiazole, a naphthothiazole, a thianaphtheno-7′,6′,4,5-thiazole, an oxazole, a benzoxazole, a naphthoxazole, a selenazole, a benzoselenazole, a naphthoselenazole, a thiazoline, a pyridine, a quinoline, an isoquinoline, a 3,3-dialkylindolenine, a benzimidazole, a naphthimidazole, etc. used in cyanine-type dyes while the merocyanine and merocarbocyanine dyes are advantageously prepared by condensing our imidazolium salts with any of the intermediates containing 4- to 6-membered heterocyclic ketomethylene nuclei, e.g., a 3-thietanone-1,1-dioxide, a 2-thio-2,4-thiazolidinedione, a rhodanine, a 2-thiobarbituric acid, a barbituric acid, a 2-thiohydantoin, a hydantoin, a 2-thio-2,4-oxazolidinedione, a 2-thiazolin-4-one, a 2-pyrazolin-5-one, a 2-imidazolin-4-one, a 2-imidazolin-4-thione, a 2-imidazolin-4-selenone, etc used to make merocyanine-type dyes.